(12) United States Patent
He

(10) Patent No.: US 7,710,552 B2
(45) Date of Patent: May 4, 2010

(54) METHOD AND APPARATUS FOR EXTRACTING LIGHT FROM AN OPTICAL WAVEGUIDE

(75) Inventor: Gang He, Quebec (CA)

(73) Assignee: Exfo Inc., Quebec (CA)

( * ) Notice: Subject to any disclaimer, the term of this patent is extended or adjusted under 35 U.S.C. 154(b) by 341 days.

(21) Appl. No.: 11/885,411

(22) PCT Filed: Feb. 28, 2006

(86) PCT No.: PCT/CA2006/000303

§ 371 (c)(1),
(2), (4) Date: Aug. 31, 2007

(87) PCT Pub. No.: WO2006/092051

PCT Pub. Date: Sep. 8, 2006

(65) Prior Publication Data

US 2008/0192241 A1    Aug. 14, 2008

Related U.S. Application Data

(60) Provisional application No. 60/656,902, filed on Mar. 1, 2005.

(51) Int. Cl.
G01N 21/00    (2006.01)
(52) U.S. Cl. ..................................... 356/73.1
(58) Field of Classification Search ........................ None
See application file for complete search history.

(56) References Cited

U.S. PATENT DOCUMENTS

| | | | |
|---|---|---|---|
| 5,005,005 A * | 4/1991 | Brossia et al. | 340/604 |
| 5,040,866 A | 8/1991 | Engel | |
| 5,078,489 A | 1/1992 | Lieber | |
| 5,315,365 A | 5/1994 | Hakimi et al. | |
| 5,781,285 A | 7/1998 | Mampaey et al. | |
| 5,835,458 A * | 11/1998 | Bischel et al. | 369/44.12 |

OTHER PUBLICATIONS

A Practical Instrument for Non-Intrusive Detection of Light on Singlemode Optical Fibers, Penfold; (IEEE International Conference on Communications, 1991. ICC 91, Conference Record. Jun. 23-26, 1991 pp. 312-318.

* cited by examiner

*Primary Examiner*—Tu T Nguyen
(74) *Attorney, Agent, or Firm*—Thomas Adams

(57) ABSTRACT

Apparatus for extracting light from an optical waveguide (12) by bending the waveguide to such an extent that a portion of any light propagating in the waveguide leaks therefrom comprises a bending unit (10) for bending a portion of the waveguide in dependence upon a control signal (S) and providing a detection signal ($P_d$) proportional to light leaked from the waveguide. A control unit (14) varies the control signal (S) in response to the detection signal ($P_d$) to cause the bending unit (10) to progressively decrease the bending angle and has a processor unit (46) which computes a rate of change ($dP_d/dR$) of the detection signal ($P_d$) with respect to bending radius (R) and causes the bending unit to maintain that bending radius at which the aforesaid rate of change is substantially equal to a predetermined value.

18 Claims, 5 Drawing Sheets

| Fibre A | Fibre B | Fibre C | Fibre D | Fibre E | Fibre F | Fibre X | Blue | Green | Clear | Orange |
|---|---|---|---|---|---|---|---|---|---|---|
| G.652 | G.652 | G.652 | G.652 | G.652 | G.652 | G.655 | G.652 | G.655 | G.653 | G.652 |
| F/L | Siecor | FOT. | A.F | Cor. | 0.9mm | M-6 | Dep.C | D.F | DSF | Mat.C |
| 3mm | 3mm | 3mm | 3mm | 1.6mm | | 3mm | 0.25mm | 0.25mm | 0.25mm | 0.25mm |
| (HARD) | | SMF28 | SMF28 | SMF28 | | LEAF | | | | |

FIG. 2B

METHOD AND APPARATUS FOR EXTRACTING LIGHT FROM AN OPTICAL WAVEGUIDE

CROSS-REFERENCE TO RELATED APPLICATION

This application claims priority from U.S. Provisional patent application No. 60/656,902 filed Mar. 1, 2005, the contents of which are incorporated herein by reference.

TECHNICAL FIELD

The present invention relates to a method and apparatus for extracting light from an optical waveguide by bending it. Embodiments of the invention may find application in the fields of live fiber detection, signal sampling, splice loss testing, measurement of power in light propagating in such an optical waveguide, and so on.

BACKGROUND ART

It is often necessary to be able to detect a signal in an optical waveguide by extracting a portion of the light being guided. For example, it is useful to be able to distinguish between live (signal carrying) and dark (no signal) optical waveguides, to be able to extract a signal for sampling, to perform an approximate measurement of the guided optical power, to perform accurate differential measurements of the guided optical power before and after a possible localized loss such as a splice, and to determine the direction of traffic. It is desirable to perform these operations without disrupting, overly attenuating or distorting the signal, especially in telecommunications systems, as the margins with which many such systems operate often do not permit more than about one decibel of additional attenuation without the risk of inducing errors to the transmission, thereby leading to potential traffic interruptions and even system shutdowns.

It is well known that light can be extracted from an optical waveguide such as an optical fiber by bending it so that a fraction of the guided light leaks from the waveguide. The extracted light is known as the bending loss. Devices for bending optical fibers to extract light in this way are often referred to as "optical fiber taps" and may use "micro-bends" or "macro-bends". U.S. Pat. No. 5,708,499, for example, discloses the use of both micro-and macro-bends, However, in most central office and outside plant applications, optical fiber is cabled, i.e. protected by one or both of a buffer material (typically silicon or epoxy resin) and a plastic jacket (usually PVC or polyethylene). Various cable types are common, but jacketed cables with a 3-mm diameter and tight-buffered fiber with a 900-micrometer nominal diameter are among the most common. It is not practical to apply micro-bends to such a jacketed or buffered fiber.

Macro-bends have a radius of curvature that is much larger than the waveguide diameter. When such a bend is applied to an optical fiber, it causes a significant amount of the light to leak out, even if the fiber is cabled. Moreover, in most cases, both the buffer coating and jacket materials have some degree of transparency at the near-infrared wavelengths used in telecommunication systems, permitting a non-negligible fraction of the leaked light to be detected externally.

For a given fiber, the degree of macro-bending required to detect a certain amount of leaked light is strongly dependent upon the wavelength. Less bending is required for longer wavelengths and more bending is required for shorter wavelengths. For a given wavelength, the required detection sensitivity is also dependent upon fiber type and the types and colors of the coatings and jackets protecting the fiber. The performance of a macro-bending device for signal detection is largely dependent upon the amount of light that is extracted, which is directly proportional to the induced attenuation of the guided light ("insertion loss"). Clearly, if the guided signal power is low, it is desirable to bend the waveguide to a relatively tight radius so as to extract as much signal as possible, but without exceeding the loss margin of the system, distorting the signal or even causing physical damage to the fiber. It is desirable, therefore, to control the bending radius carefully.

It is known for so-called "clip-on" devices to employ macro-bending means to extract a portion of the guided light from an optical waveguide and detection means to determine the amount of extracted light. However, almost all of the prior art is limited to macro-bending introduced by a fixed bending structure, i.e. where the bend radius is either not changed, or where a portion of the escaping light detected is not detected while the bend radius is changed (during the cable clamping process, for instance).

Among this fixed-bending-structure prior art, macro-bending devices are known which take account of the different fiber, jacket, and coating types. One such device is marketed by EXFO Electro-Optical Engineering Inc. under the product name LFD-200 live Fiber Detector. This clip-on device comprises a so-called "fixed" bending means with a set of interchangeable heads of different shapes and sizes over which the fiber is bent to a fixed bending radius. A disadvantage of this approach is that the insertion loss caused by this fixed macro-bending is strongly dependent upon wavelength, making it impractical to optimize both the insertion loss and sensitivity when the wavelength of the propagating light could be, say, 1310 or 1550 nm. Another disadvantage of this device is that the technician who is using the device has to change the device head manually for each fiber type. The use of the device is therefore limited to the set of cable types and wavelengths for which the set of interchangeable heads are designed.

In another known macro-bending device, disclosed in U.S. Pat. No. 4,671,653, the level of detected light is compared to a predetermined threshold determined by the fixed bending structure, and, if this threshold is reached, an indicator light turns on. A disadvantage of this device is that the level of detected light will be dependent upon factors such as the optical power in the fiber, the fiber type, and the wavelength, as well as the amount of absorption and scattering that occurs as the light passes through coatings and jackets. Hence, the choice of a threshold value is very approximate and depends, upon the particular application. Moreover, there is, in general, no information as to the macro-bending-induced insertion loss.

U.S. Pat. No. 5,781,285 discloses an optical fiber tap which, in order to avoid mechanical damage to the fiber, progressively decreases the bending radius of the fiber under test by means of a probe that pushes laterally against the fiber. The primary purpose of this device is to detect the presence or absence of light in the fiber. This device can be used with various fiber types, as several different concave areas having different radii of curvature may be offered on the bottom plate of the instrument to introduce respective macro-bends. A probe is used to push against the fiber, and a detector is located in the probe. It is noted that the use of different concave areas is functionally equivalent to the use of interchangeable heads in the aforementioned EXFO instrument. In the absence of knowledge of fiber type, wavelength, and optical power in the fiber, the macro-bending-induced insertion loss of this device could lead to excessive loss and hence possible system failure.

European patent No. 0639762 also discloses an optical fiber tap which applies a macro-bend, but makes use of a damping mechanism to limit the abruptness with which this macrobend is applied, thereby reducing the chance of fiber damage and, in the case of a live transmission system, thereby reducing the risk of an error burst during application. However, there is no information as to the macro-bending-induced insertion loss and this device could lead to excessive loss and hence possible system failure.

Other known macro-bending devices involve winding the optical fiber around a mandrel. European Patent No. 0361962 discloses such a fiber tap which winds the fiber around a conical mandrel. The bending radius is gradually reduced as the mandrel is rotated about its axis until some leaked light is detected by a detector, or until a predetermined maximum level of bending is reached. A disadvantage of this device is that, after the fiber has been bent enough for some light to be extracted, light is being leaked along a section of fiber that is longer than necessary for detection purposes. As a result, a large proportion of this light is not detected and is therefore wasted. As before, any measurements taken with this device must be calibrated for fiber type and wavelength, as well as jacket and buffer coating type, and, in the absence of any of this knowledge, it is not possible to derive the macrobend-induced insertion loss.

More recently, U.S. patent application Ser. No. 2005/0041902 (Frigo et al.) disclosed a method and apparatus for identifying an optical fiber by applying time-varying modulation to an optical signal propagating through the fiber. A transmitter, for example a vibrating piston contacting the fiber laterally, applies the time-varying modulation at a first location, and a downstream receiver extracts light by bending the fiber around a mandrel to extract a portion of the signal, and detects the time-varying modulation in the extracted portion.

As in the case of the aforementioned EXFO device, Frigo et al.'s primary embodiments use interchangeable mandrels or "anvils", each characterized by a different radius of curvature. As explained above, the use of such mandrels is inconvenient in the field, particularly when the technician is not certain of the wavelength or power level in the fiber under test.

Frigo et al.'s primary aim is to detect the presence of the modulation signal on the light propagating in the fiber while minimizing the intrusiveness of the measurement. Consequently, they seek to extract a minimal amount of the light from the fiber, i.e., only enough to enable detection of the time-varying signal, so as to ensure that insertion loss limits are not exceeded. In the absence of knowledge of the optical power in the fiber, the fiber type and wavelength information, however, it is not possible to derive the actual value of the macrobend-induced insertion loss and, hence, be assured that insertion loss limits are not being exceeded.

DISCLOSURE OF INVENTION

The present invention seeks to overcome, or at least ameliorate, one or more of the disadvantages of these known devices, or at least provide an alternative. To this end, embodiments of the present invention monitor the light leaking from the waveguide while bending it and stop decreasing the bend radius when a rate of change with respect to bending radius of the derivative of the power of said detection signal with respect to the bending radius reaches a predetermined level.

According to one aspect of the present invention, apparatus for extracting light from an optical waveguide by bending the waveguide to such an extent that a portion of any light propagating in the waveguide leaks therefrom characterized by a bending unit for bending a portion of the waveguide in dependence upon a control signal (S) and providing a detection signal ($P_d$) proportional to light leaked from the waveguide, and a control unit for varying the control signal (S) in response to said detection signal ($P_d$) to cause the bending unit to progressively decrease the bending radius (R), the control unit computing a rate of change (e.g. $dP_d/dR$ where $P_d$ is in logarithmic units) of said detection signal ($P_d$) with respect to bending radius (R) and causes the bending unit to maintain that bending radius at which the aforesaid rate of change is substantially equal to a predetermined value.

In this specification, the term "bending angle" refers to the angle between the ingoing and ongoing portions of the fiber—hence with no bending it is 180 degrees. The smaller the bending angle, the smaller the radius of curvature of the fiber at the bend.

As discussed later in this application, such an arrangement allows the user to control the insertion loss caused by the bend by determining $dP_d/dR$. As a result, attenuation of the detected light by cladding, coating etc. does not affect the measurement adversely.

The slope may be determined by changing the radius by a known amount ($\Delta R$), measuring the corresponding change in the detected optical power ($\Delta Pd$, in dB units) and dividing the latter by the former.

Alternatively, the bending angle may be monitored while decreasing the bending radius to effect a predetermined change in the derivative power ($\Delta Pd$), and the change in radius measured.

Another alternative is to apply, mechanically, a known modulation ($\Delta R$) about a macro-bend with radius $R_0$, and monitor the corresponding power modulation depth ($\Delta Pd$) to obtain the slope at radius $R_0$.

Conversely, an amplitude modulation $\Delta R$ about a macro-bend with radius $R_0$ may be applied so as to maintain a fixed power modulation depth ($\Delta Pd$) to obtain the slope.

Providing that the losses induced by the fiber buffer, jacket, and so on, are known approximately, the optical power of the signal propagating in the waveguide may be measured by setting the insertion loss IL to a known value.

Preferably, the control unit controls the bending unit to bend the waveguide initially to a preset radius and men continues to decrease the bending radius or angle progressively. Where the waveguide is an optical fiber waveguide of the kind used in telecommunications systems (e.g. G.652, G.653, G.654, G.655) as defined by the International Telecommunications Union), the initial bend radius might be selected so that, at the longest operating wavelength of the system concerned (e.g. 1625 nm), the leaked light will not represent more than, say, 0.1 dB of induced loss in the remaining transmitted light.

One approach for determining the slope of the bending loss versus bending radius curve is to progressively and monotonically decrease and monitor the bending radius while detecting a part of the light leaking from the waveguide. From these measured values, the slope may be readily calculated in the control unit. While this is generally satisfactory, in some cases, especially where it cannot be presupposed that the optical power of the signal propagating in the waveguide is approximately constant over the measurement period of several seconds, there may be a non-negligible error in the determination of the slope.

Advantageously, the bending unit means may be adapted to superimpose a relatively low amplitude oscillation upon a gradually decreasing bending radius, with an oscillation period much shorter than the rate of decrease of overall bend radius and shorter than the period over which most drifts and instabilities may occur in the transmission system optical power. Such low amplitude oscillation or "dither" facilitates measurements by determining the slope of the bending loss versus bending radius curve in "real time", thereby allowing a corrective feedback control to be applied to the bending unit to maintain the induced bending loss within a prescribed range, for example from approximately 0.1 dB to 1 dB.

This "dither" approach for determining the aforementioned slope is largely independent of the effects of, for example, a drop in optical power in the waveguide. A convenient dither frequency would be a value between about 10 Hz and 40 Hz, taking care to avoid sub-harmonics of the 50 Hz and 60 Hz power-grid frequencies. Such a dither frequency represents a good tradeoff between the need for a sufficiently rapid dither to avoid influence from system power variations, and a sufficiently slow dither to avoid undue power consumption in the apparatus. (For a given dither amplitude, power consumption increases approximately as the square of the dither frequency.)

Preferably, the apparatus further comprises means for limiting the bending radius to a predetermined minimum value without leaked light having been detected.

It should be noted that, although an insertion loss of 0.1 dB can be chosen with this technique, in most cases the preferred range of insertion loss is between 0.4 and 0.7 dB, as this range represents an excellent trade-off between detection sensitivity of the apparatus and minimal effect upon system operation.

In preferred embodiments, the bending unit comprises a pair of spaced-apart jaws for receiving the waveguide, and actuator means for causing movement of the jaw members so as to cause the waveguide therebetween to bend, the actuator means being controlled by the control unit.

The bending unit may comprise at least one photodetector for detecting said leaked light and providing a corresponding electrical signal as, or for use in deriving, said detection signal. Two such photodetectors may be provide, one upstream and the other downstream of the middle of the bend.

In preferred embodiments of this aspect of the invention, the bending unit and control unit are housed in a substantially light-tight compartment having a lid, with an interlock operable to turn the apparatus off when the lid is opened, and vice versa.

According to another aspect of the present invention, there is provided a method of extracting light from a waveguide by bending the waveguide to such an extent that a portion of any light propagating in the waveguide leaks therefrom, comprising the steps of bending a portion of the waveguide in dependence upon a control signal and providing a detection signal representing light leaked from the waveguide, progressively decreasing the bending radius while monitoring the detection signal until a rate of change with respect to bending radius of said detection signal ($dP_d/dR$) reaches predetermined value.

Various objects, features, aspects and advantages of the present invention will become more apparent from the following detailed description, taken in conjunction with the accompanying drawings, of a preferred embodiment of the invention, which is provided by way of example only.

BRIEF DESCRIPTION OF THE DRAWINGS

FIG. 2B is a table listing those fibers;

DETAILED DESCRIPTION OF PREFERRED EMBODIMENTS

Figure 1:
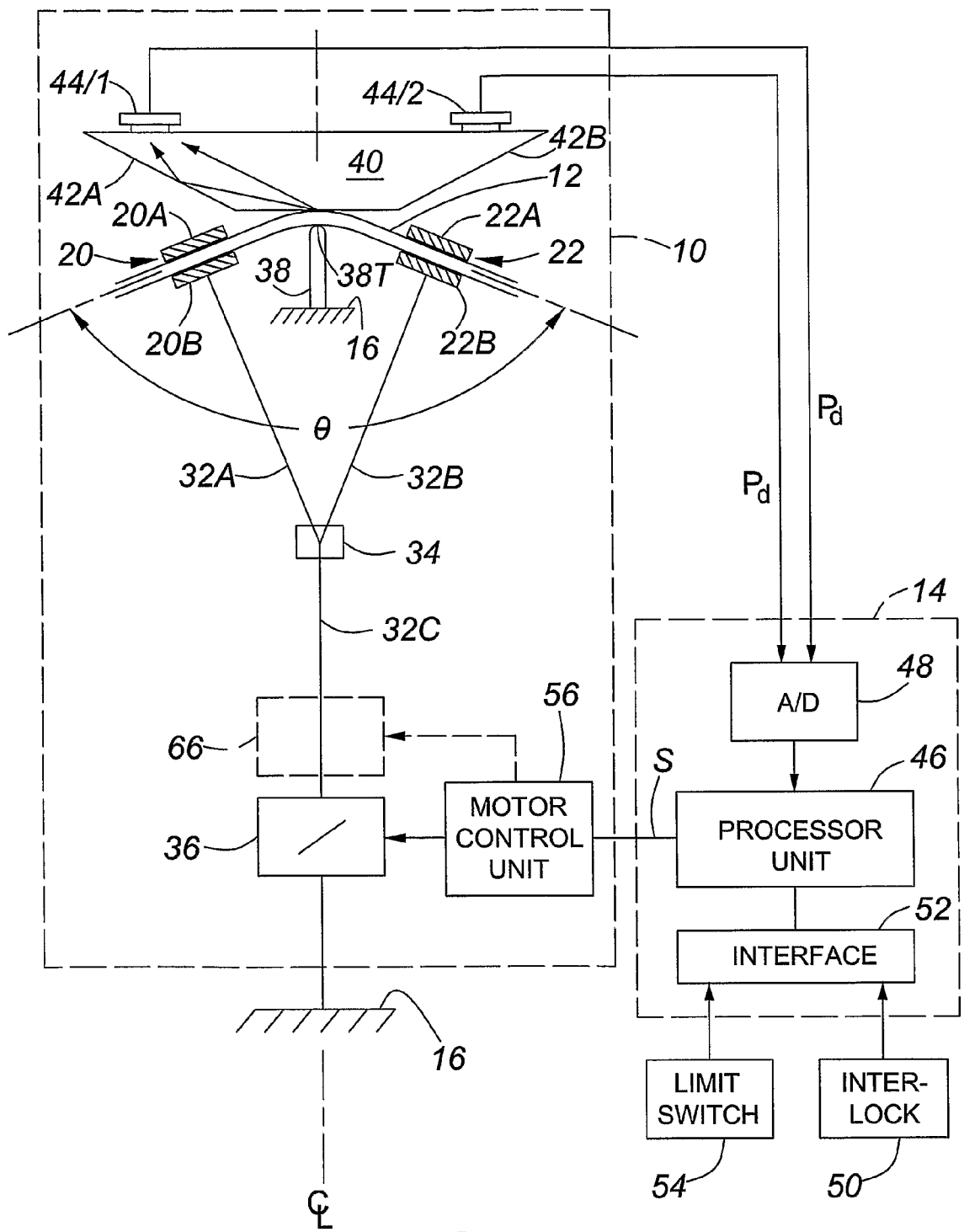
FIG. 1 is a schematic diagram of apparatus for extracting light from an optical fiber by bending it.

The invention is predicated upon the realization that most, and potentially all, presently-available single mode optical fibers used in telecommunications applications, when used within their operating range, exhibit a similar rate of change of bending loss with respect to bending radius over a range of bending losses that are less than the usual maximum allowable bending loss (insertion loss) for the typical optical communication system in which such fibers are deployed. For most commercially available optical fibers, this range of bending loss extends from about 0.1 dB to about 1.0 dB. It is believed that the measurements made with this selection of fiber and cable types may be extrapolated to others, and that they are valid for almost all single-mode silica fibers used over the standard telecommunications transmission windows (typically 1250 nm to 1625 nm).

Consequently, by measuring the slope of the bending loss versus bending radius curve as the bending radius is decreased, i.e., by detecting the rate of change of the leaked light (Pd) with bending radius (R), and by subsequently maintaining the bending radius at the required slope value, one can have a high degree of confidence that the bending-loss induced by the bending means is less than 1 dB, and most likely less than 0.7 dB. It should be noted that the efficiency of the light detection is not important for this determination of the slope, provided that the detected light power is sufficiently above the sensitivity limit of the detector and its associated electronics and that the collection efficiency of the detector does not change significantly as the waveguide is bent.

An embodiment of the invention will now be described with reference to FIG. 1, in which apparatus for extracting light from an optical waveguide by bending it comprises a bending unit 10 for controllably bending a portion of an optical waveguide, specifically an optical fiber 12, so as to cause light to leak from the fiber, detecting light leaked from the fiber and providing a corresponding detection signal, and a control unit 14 for controlling the bending mechanism 10 to progressively decrease the bending radius while monitoring the detection signal. The bending unit 10 is carried by a support member 16 housed in a case (not shown).

The bending unit 10 comprises two sets of jaws 20 and 22 between which time fiber 12 is slidably inserted for bending. Jaw 20 comprises a first pair of jaw members 20A and 20B while jaw 22 comprises a second pair of jaw members 22A and 22B.

The jaw members 20 and 22 are coupled by connecting rods 32A and 32B, respectively, to a coupling 34 which is coupled by a third connecting rod 32C to an actuator unit 36, specifically a linear drive motor. The connecting rods 32A and 32B are coupled pivotally to the coupling 34 and jaws 20 and 22. The actuator unit 36 moves the coupling 34 to and fro along the longitudinal axis CL, which causes the jaws 20 and 22 to bend the fiber 12 inserted between them. An anvil member 38 is mounted to the support 16 at the opposite side of the jaw assembly, i.e., between the fiber 12 and the coupling 34, so that a tip portion 38T of the anvil member 38 contacts the fiber 12 midway between the jaws. When the actuator unit 36 urges the connecting rods 32A and 32B towards the anvil member 38, (i.e., downwards in FIG. 1), the fiber 12 is bent around the anvil tip portion 38T. The parts of the optical fiber 12 within the jaws can slide relative to the jaws as the fiber 12 bends, so as to avoid damaging the fibers.

A transparent block 40 having oblique opposite end surfaces 42A and 42B is positioned opposite the anvil tip 38T and in close proximity and serves as a leaked light collector to collect light $P_d$ leaking from the bend portion of the fiber 12 and convey it to one or the other of two photodetectors 44/1 and 44/2 disposed at the distal side of the block. The detectors 44/1 and 44/2 are connected to the control unit 14 which has a processor unit 46 and an analog-to-digital converter 48 for converting the detection signal $P_d$ from either of detectors 44/1 and 44/2, respectively, into corresponding digital signals for processing by the processor unit 46.

Two detectors 44/1 and 44/2 are provided because the apparatus may need to detect light propagating in either direction. Generally, the control unit 14 will use the detection signal supplied by only one of them, namely the detector that is downstream (as defined by the direction of light propagation in the fiber 12) of the macro-bend applied to the fiber 12.

The apparatus is mounted in an outer case (not shown) that is equipped with an interlock switch 50 that is connected to the processor unit 46 by a suitable interface 52 so that the processor, unit 46 can detect whether the case is open or closed and so ensure that the fiber 12 cannot be bent when the outer case is open or closed. A limit switch 54 also is connected to the processor unit 46 via the interface unit 52 and serves to prevent the fiber 12 from being damaged due to excessive bending.

The actuator/drive motor 36 is controlled by the processor unit 46 by way of a motor control unit 56 which is responsive to a control signal (S) from the processor unit 46 to cause the primary drive motor 36 to move the coupling 34 to and fro as previously described.

In use, with the fiber 12 inserted between the jaws 20 and 22, an initial bend is applied to the fiber 12, with a radius of curvature known to be sufficiently large that fiber 12 will not suffer more than a predetermined amount, for example 0.1 dB, of bending loss. This predetermined initial bending loss limit is based upon typical fiber parameters and the full range of transmission wavelengths used in the system concerned, e.g. in telecommunications applications. (It will be appreciated that certain fiber coatings and jackets, such as a dark blue Teflon coating, will attenuate the light to such a degree that any measurement of bend loss would be impractical.)

If no, or insufficient, light is detected at the initial bend radius, then the bend radius of the fiber 12 will be decreased until a predetermined level of light is detected. This level corresponds to a sufficient signal-to-noise ratio being attained as determined by the processor unit 46. The bend radius will be further decreased in equal steps by the primary drive motor 36. At each step, the processor unit 46 monitors the outputs of the two detectors 44/1 and 44/2 to determine which of them is providing an electrical signal $P_d$, samples that electrical signal $P_d$, and computes the instant optical power, and then the difference between fire instant optical power and the previously computed optical power so as to obtain the rate of change of the optical power during that sampling interval, thereby deriving a measurement of rate of change of the optical power of the leaked light with respect to bending radius.

Because the rate of change is measured, rather than absolute loss, the determination of the insertion loss is independent of the particular jacket or coating through which the leaked light has passed, provided, of course, that the jacket and coating pass enough light to be detected. The signal from the detector may be calibrated during manufacture for a particular detection system. Although, in principle, the optical power of the detected light will be dependent upon the type of coating, in practice most coatings used in the telecommunications industry introduce absorption and scattering losses that are quite similar. The same applies to buffers and to jackets, where they are provided. Hence, for each type of cable, a "default" calibration value can be stored in the memory of processor 46 for use in determining the approximate absolute optical power of the light propagating in the waveguide.

It should be appreciated that, since the absorption and scattering losses of most coatings, buffers and jackets are generally independent of wavelength, at least within normal telecommunications wavelength ranges, the measurement of bending loss is substantially independent of wavelength; hence, no a priori knowledge of the wavelength of the light propagating in the waveguide is required for a rough power estimate.

For improved power measurement precision, however, the detector may be calibrated over a range of wavelengths. Then, when measuring power, the user will enter a prescribed wavelength and the processor 46 will access a table of calibration factors for prescribed wavelengths, allowing conversion of the output signal of the detector into a corresponding optical power.

It should be noted that, although absolute bend radii need not be known precisely, the change in bend radius introduced by the step size of the primary motor or by the dither amplitude of the secondary motor needs to be known. This can be obtained via a factory calibration of the apparatus.

When the rate of change of optical power with respect to bend radius reaches a predetermined value, the processor unit 46 sends a signal to the motor control unit 56 to stop the drive motor 36. As will be demonstrated hereinafter, for most optical fibers and wavelengths used in the telecommunications industry, i.e., 1270 nm to 1625 nm, this predetermined value corresponds to a value lying between 0.1 dB and 1.0 dB of bend loss. This predetermined value may be optimized for the particular application, but is substantially independent of the wavelength and of the fiber, coating, and/or jacket type of the fiber under test.

An override option may be given to the user operating the apparatus to continue decreasing the bend radius to increase the detected signal level. A warning then may be given to the user stating that the resulting higher bend loss, especially for longer telecommunications wavelengths, (e.g., 1625 nm) may exceed the loss budget of the system. The detected signal then may be analyzed using the processor unit or an external device.

Figure 2A:
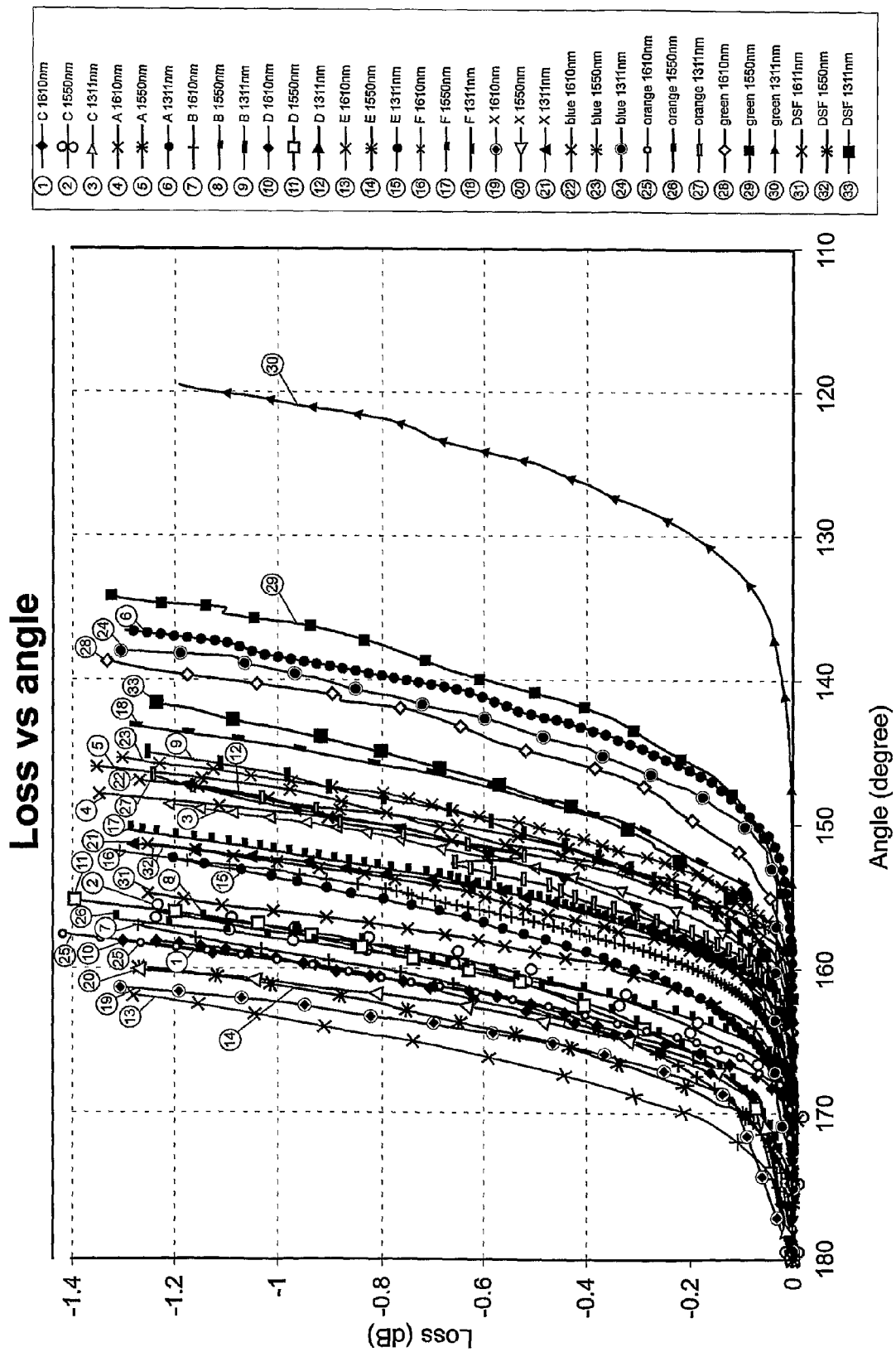
FIG. 2A shows typical curves interpolated from measurements of bending loss as a function of bending angle, i.e., for a range of bending radii, for a selection of fibers, cable types and wavelengths (vis. 1310 nm, 1550 nm and 1610 nm)
Figure 3:
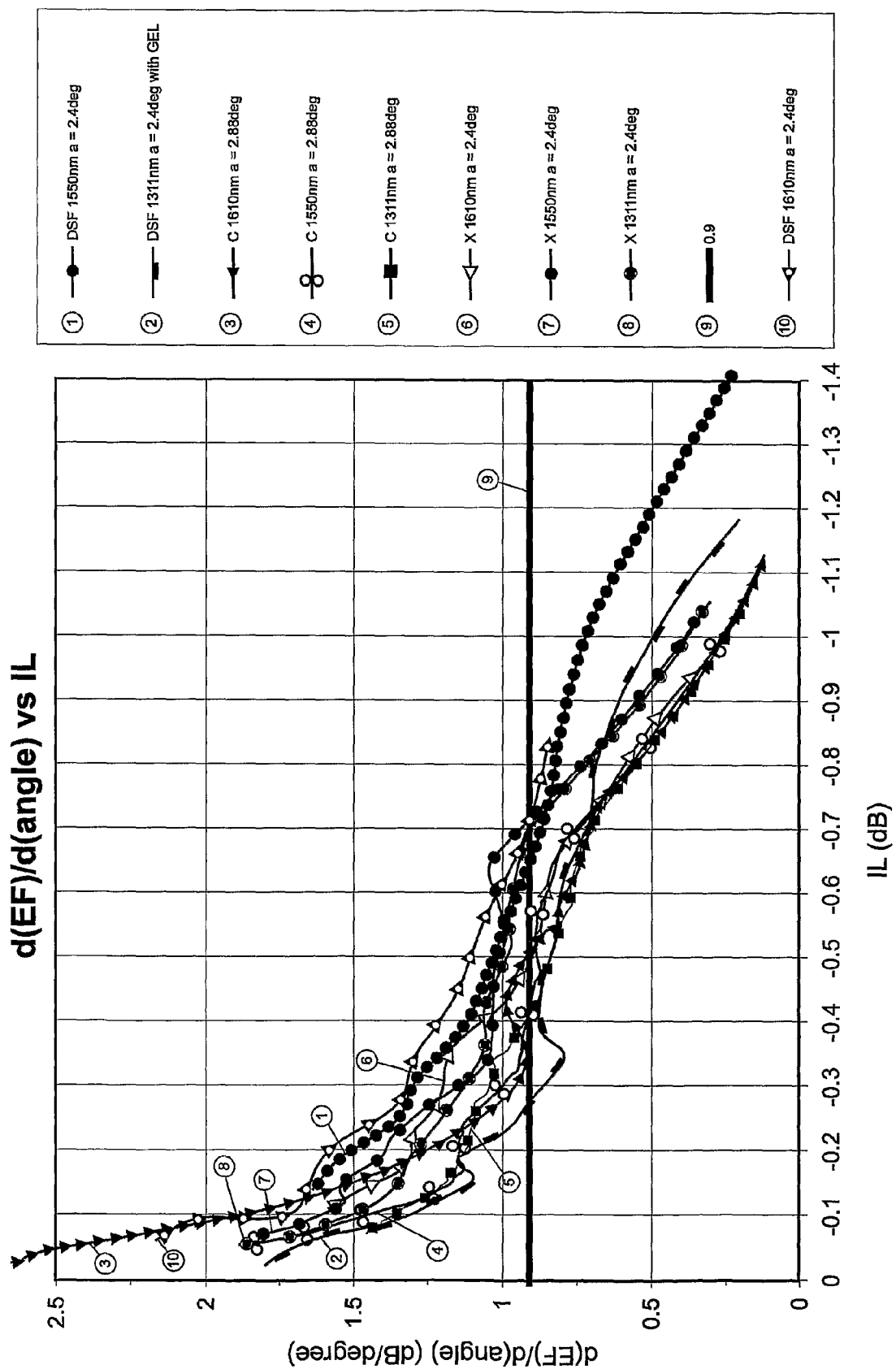
FIG. 3 illustrates appropriately normalized curves of rate of change of escape factor (EF) with respect to bend angle ($\theta$) versus insertion loss for the most widely disparate subset of the selection of FIGS. 2A and 2B.

It should be appreciated that, in this case, bending loss and insertion loss are effectively synonymous. Because insertion loss is the more common term, that will be used in the following description. The basis for concluding that the insertion loss will be within the prescribed range is illustrated in FIGS. 2A, 2B and 3. Referring to FIGS. 2A and 2B, it can be seen that, for each of a selection of different fibers and wavelengths, when insertion loss (IL) is measured as a function of bending radius or bend angle, the slopes of the curves are similar, at least when the insertion loss exceeds about 0.1 dB. As shown in FIG. 3, when the derivative of EF, the escape factor derived as Pe divided by Pin, with respect to bending radius is plotted as a function of insertion loss IL, for almost any single-mode fiber type and at any wavelength in the telecommunications window, one obtains monotonically increasing curves that have different inflection points and different forms. However, over the range of insertion losses from about 0.4 dB to about 0.7 dB, they have substantially the same slope.

As indicated above, it is believed that the measurements made with this selection of fiber and cable types may be extrapolated to others, so that the behavior shown in FIG. 3 may be considered to be substantially "universal", valid for almost all single-mode silica fibers used over the standard telecommunications transmission windows (typically 1250 nm to 1625 nm).

Present optical networks typically are designed to readily tolerate an insertion loss of, say, 1.2 dB in a particular link. If a measuring instrument introduces more than 1.2 dB of insertion loss, there may be a risk that the link may be shut down, particularly if the link's initial design margin has already been largely compromised due to intervening repairs, cable degradation, etc. since the system was first installed. Because the afore-mentioned bending loss range of 0.1 to 1.0 dB is less than the 1.2 dB limit, ensuring that the slope does fall within this range ensures that adequate leakage occurs without the limit of 1.2 dB being exceeded. It will be appreciated that the invention is not limited to these values but could be used to ensure that other values of insertion loss are not exceeded.

It should be noted that the above-described technique means that the user need not know what kind of fiber or other waveguide is bang tested and there may be no need, for example, to have interchangeable heads for different fiber types or when different wavelengths are used.

Where the coating, buffer and jacket losses are known, however, the apparatus may be used to measure the actual power of the light propagating in the waveguide, employing the relationships illustrated in FIG. 4, as will now be described.

Figure 4:
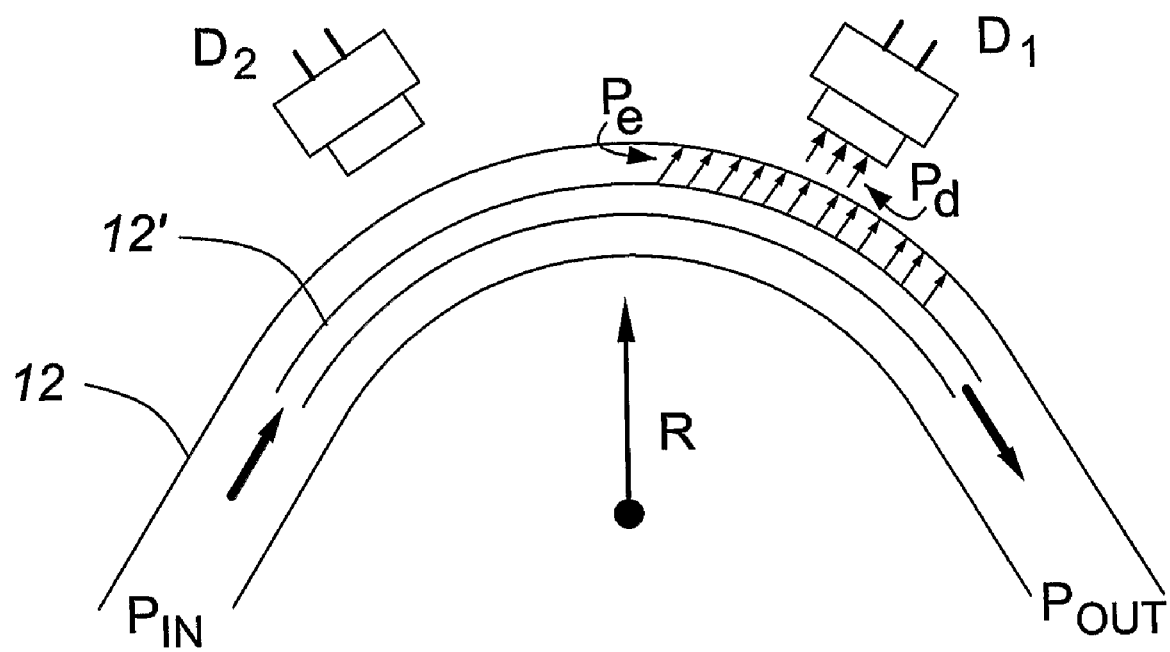
FIG. 4 illustrates leakage of light at a bend in a waveguide.

FIG. 4 shows a bend in an optical waveguide, specifically an optical fiber 12, and a leaked light detection system, including a photodetector D1. Pin represents the optical power of the light propagating in the fiber before the bend, Pout is the optical power of the light still propagating in the fiber downstream from the bend, Pe is the power of the leaked light escaping from the fiber core 12' at the bend region and Pd is the optical power of the portion of the leaked light detected by detector D1.

The definitions and relationship between insertion loss (IL) (or bending loss) introduced by bending the fiber and the escape factor (EF) (the fraction of the light in the fiber core that leaks from the fiber core as a result of the macro-bend) are as follows:

Insertion Loss in dB: $IL = 10 \times \log(Pout/Pin)$ (1)

Power relation:

$Pe = Pin - Pout$ (2)
$= EF \times Pin$ where $EF = 1 - Pout/Pin = 1 - 10^{(IL/10)}$ (3)

It can be seen from these equations that the power Pin of the light propagating in the fiber can be found from the power $P_d$ of the detected leaked light if the insertion loss (IL) introduced by macro-bending is known, together with a collection efficiency factor CE, i.e., the fraction (Pd) of the total leaked light Pe that is detected, which is dependent upon both detection system design and the light scattering and absorption properties of the fiber coating, buffer and/or jacket types. For the more general case:

$Pin = (CE)/(EF)P_d$ (4)

It will be appreciated that the collection efficiency factor CE will usually be calibrated for the most common coatings, buffers and jacket combinations, in order to measure absolute power level in the fiber; however, as mentioned above, default values could be stored and used. Moreover, it should be noted that the escape factor EF is only for the fraction of light escaping from the core 12', whereas the collection efficiency CE takes into account such things as the buffer, jacket, etc., as well as the collection angle of the detection optics.

The determination of the insertion loss may be facilitated by modulating the bending of the waveguide about a macro-bend of radius $R_0$, rather than the step-by-step approach described above. The peak-to-peak variation $\Delta P_d/P_d$ (in dB) in the detected signal $P_d$ resulting from the peak-to-peak variation $\Delta R/R$ in bend radius provided by the modulation would be used by the processor 46 to calculate the slope of the insertion loss with respect to bend radius. It should be appreciated that this could be accomplished by maintaining a constant $\Delta R$ while monitoring $\Delta Pd$, or adjusting $\Delta R$ so that $\Delta Pd$ remained constant, or some combination thereof. This dithering approach may be used in combination with servo-feedback to maintain the insertion loss at a prescribed value more easily, even if, for example, the optical power of the light propagating in the fiber varied.

Thus, as shown in dashed lines in FIG. 1, a secondary drive motor 66 maybe provided in series between the primary drive motor 36 and the coupling 64 of the connecting rods 32A and 32B. The secondary drive motor, as a whole, is moved linearly and progressively by the primary drive motor 60 and itself imparts an oscillating movement to the coupling 64, thereby superimposing a corresponding modulation upon the progressively increasing linear movement imparted by the primary drive motor 60. The processor 52 then monitors the power modulation depth to obtain the insertion loss slope and uses the value for CE and the relationships explained above to determine the power.

It should be appreciated that secondary drive motor 66 could be omitted and both the linear movement and the "dither" oscillating movement provided by suitable control of the linear drive motor 36, for example by applying a suitable composite control signal (S) to a high resolution stepper motor 36.

Various other modifications are envisaged. For example, instead of incrementing the bending radius by known amounts and monitoring the resulting changes in the power Pd of the detected leaked light, the apparatus could decrease the bending angle to produce predetermined increments in the optical power and monitoring the bending radius from an encoder to obtain the slope.

Likewise, where the dithering approach is used, instead of applying a known modulation $\Delta R$ about a macro-bend radius $R_0$, a variable amplitude (not frequency) modulation $\Delta R$ about a radius $R_0$ so as to maintain a fixed power modulation depth $\Delta Pd$ to obtain the slope.

Various novel measurement procedures may performed using apparatus embodying the present invention.

For example, the apparatus may be used for measuring localized loss, for example splice loss or connector loss, by taking measurements at two spaced-apart locations, one upstream and the other downstream of the loss event. The first-mentioned method of light extraction is performed at each location, and the amount of extracted light is recorded by the processor unit. After the second measurement has been recorded, it is compared with the first measurement by the processor unit. An accurate quantitative measurement of loss may only be obtained if the loss exceeds the uncertainty of the measurement. The localized loss is then determined by subtracting the power measured downstream from the power measured upstream. Uncertainties are further minimized if the two fibers that have been spliced together are of the same type and have the same coatings, buffer, and jacket type.

The apparatus may also be used in a method for determining the direction of traffic in a fiber, particularly in telecommunications applications. The detection signals from both detectors may be monitored, where the greater of the two signals at the final bend radius would originate from the downstream detector. The direction of traffic may be inferred from the orientation of the apparatus with respect to the fiber.

The apparatus could be used for any application where it is desirable to extract a portion of the light signal from an optical fiber while effectively guaranteeing that this extraction process will not adversely impair the communications link. For instance, in the application described in U.S. patent application Ser. No. 2005/0041902 (Frigo et al.), this invention would be well adapted to extract the modulated signal in a non-intrusive manner.

A variant of this apparatus could be envisaged where a portion of the light signal could be extracted from a fiber for subsequent analysis by an external instrument, e,g. an optical spectrum analyzer or communications protocol analyzer. This would involve the addition of additional collection optics beside the detectors Pd, to collect some of the escaping light and direct it via a fiber optic cable to the aforesaid extend instrument.

It will be appreciated that the fiber can be secured and bent by means other than the V-blocks and bottom surfaces of jaw 22. For example, the fiber could be inserted into a flexible tube In fact, a different kind of bending apparatus, such as that disclosed in the afore-mentioned U.S. patent application Ser. No. 2005/0041902, the contents of which are incorporated herein by reference, could be used instead of the bending unit 10 to obtain controlled bending and detection of the leaked light, the detection signals being processed in the manner described herein to obtain the slope.

In the above-described embodiment, two detectors 14 are used so that the device is bidirectional, i.e., the orientation of the device relative to the direction of propagation of the guided light does not affect the measurement. It should be appreciated, however, that a single detector could be used instead of two detectors, in which case the device would be unidirectional.

As described above, limit switch means 54 might be provided for limiting the bending radius to a predetermined minimum value without leaked light having been detected. For example, such limiting means might take the form of a shaft encoder on the drive motor or suitably placed mechanical stop(s); alternatively, where a stepper motor is used, the processor might limit step count.

INDUSTRIAL APPLICABILITY

Embodiments of the invention may reduce equipment costs because the apparatus can be used to perform various non-destructive measurements based upon optical power on almost all single-mode fibers, at any wavelength in the telecommunications window, and with any fiber protection scheme (i.e. jacket, coating) except those with opaque fiber protection. Cost may be further reduced due to the reduction in the time required to perform such live fiber tests because no calibration is required for this apparatus. Furthermore, the likelihood of the power budget of the network under test being exceeded is greatly reduced by eliminating the dependence of the apparatus upon either fixed bend radius or absolute power levels. For the same reasons, the risk of physical damage to the fiber under test due to over bending is also reduced.

The invention claimed is:

1. Apparatus for extracting light from an optical waveguide (12) by bending the waveguide to such an extent that a portion of any light propagating in the waveguide leaks therefrom, comprising:
   (i) a bending unit (10) for bending a portion of the waveguide in dependence upon a control signal (S) and providing a detection signal ($P_d$) proportional to light leaked from the waveguide;
   (ii) and a control unit (14) for varying the control signal (S) in response to said detection signal ($P_d$) to cause the bending unit (10) to progressively decrease the bending radius (R),
   the control unit computing a rate of change of said detection signal ($P_d$) with respect to bending radius (R) and causes the bending unit to maintain that bending radius at which the aforesaid rate of change is substantially equal to a predetermined value.

2. Apparatus according to claim 1, wherein said waveguide is an optical fiber.

3. Apparatus according to claim 1, wherein said predetermined value is selected such that the leaked light will not represent more than 1 dB of loss to said light propagating in the waveguide.

4. Apparatus according to claim 1, further comprising means for limiting the bending radius to a predetermined minimum value without leaked light having been detected.

5. Apparatus according to claim 1, wherein the bending unit comprises a pair of spaced-apart jaws (20, 22) for receiving the waveguide, and actuator means (36, 56; 36, 56, 66) for causing movement of the jaw members so as to cause the waveguide therebetween to bend, the actuator means being controlled by the control unit (14).

6. Apparatus according to claim 1, wherein the control unit (14) controls the bending unit (10) to decrease the bending radius in a stepwise manner, measures the value of the power of the detected light at each step and computes said rate of change between those values.

7. Apparatus according to claim 1, wherein the control unit (14) causes the bending unit (10) to modulate the bending of the waveguide while progressively varying the average bend radius, detects the modulation in the detected signal ($P_d$) and computes the said rate of change from the corresponding variations in the modulation.

8. Apparatus according to claim 7, wherein the control unit causes the bending unit to apply to the waveguide an amplitude modulation $\Delta R$ about a macro-bend with radius $R_0$ so as to maintain a fixed power modulation depth ($\Delta Pd$) to obtain the slope.

9. Apparatus according to claim 7, wherein the control unit (14) applies corrective feedback control to the bending unit (10) to maintain the induced bending loss within a prescribed range.

10. A method of extracting light from an optical fiber waveguide by bending the waveguide to such an extent that a portion of any light propagating in the waveguide leaks therefrom, comprising the steps of bending a portion of the waveguide in dependence upon a control signal and providing a detection signal representing light leaked from the waveguide, progressively decreasing the bending radius while monitoring the detection signal until a rate of change with respect to bending radius of said detection signal ($dP_d/dR$) reaches a predetermined value.

11. A method according to claim 10, wherein the bending radius is decreased in a stepwise manner, the value of the power of the detected light is measured at each step and the values used to compute the slope.

12. A method according to claim 10, wherein the bending radius of the waveguide is modulated at a prescribed frequency while progressively varying the average bend radius, the corresponding modulation depth in the detected signal is detected, and the slope computed from the corresponding variations in the modulation.

13. A method according to claim 12, wherein an amplitude modulation $\Delta R$ about a macro-bend with radius $R_0$ is applied so as to maintain a fixed power modulation depth ($\Delta Pd$) to obtain the slope.

14. A method according to claim 12, wherein the control unit applies corrective feedback control to maintain the induced bending loss within a prescribed range.

15. A method of measuring loss of an optical fiber waveguide comprising the steps of extracting light at a first location along the waveguide by bending a portion of the waveguide in dependence upon a control signal and providing a detection signal representing light leaked from the waveguide, progressively decreasing the bending radius while monitoring the detection signal until a rate of change with respect to bending radius of said detection signal ($dP_d/dR$) reaches a predetermined value, repeating the extracting and detecting steps at another location along the optical waveguide; and comparing the recorded detection signals for each location and calculating the loss by calculating the difference between the two detection signals.

16. A method according to claim 15, wherein the first and second measurements are made using different measuring instruments.

17. Apparatus for extracting light from an optical waveguide (12) by bending the waveguide to such an extent that a portion of any light propagating in the waveguide leaks therefrom, comprising:
(i) a bending unit (10) for bending a portion of the waveguide in dependence upon a control signal (S) and providing a detection signal ($P_d$) representing light leaked from the waveguide;
(ii) and a control unit (14) responsive to said detection signal to cause the bending unit to progressively decrease the bending radius, wherein the control unit (14) computes a rate of change with respect to bending radius of said detection signal ($d(Pd)/dR$) and causes the bending unit to maintain that bending radius when the aforesaid rate reaches a predetermined value.

18. A method of measuring loss of a splice in an optical fiber waveguide comprising the steps of extracting light at a first location along the waveguide at one side of the splice by bending a portion of the waveguide in dependence upon a control signal and providing a detection signal representing light leaked from the waveguide, progressively decreasing the bending radius while monitoring the detection signal until a rate of change with respect to bending radius of said detection signal (dPd/dR) reaches a predetermined value, repeating the extracting and detecting steps at another location along the optical waveguide, at the other side of the splice; and comparing the recorded detection signals for each location and calculating the splice loss by calculating the difference between the two detection signals.

* * * * *